Oct. 31, 1939.  W. N. THOMPSON  2,178,503
GRASS AND WEED CUTTER
Filed Sept. 1, 1937  2 Sheets-Sheet 1

Inventor
William N. Thompson,
By Stone, Boyden & Mack,
Attorneys

Oct. 31, 1939.  W. N. THOMPSON  2,178,503
GRASS AND WEED CUTTER
Filed Sept. 1, 1937   2 Sheets-Sheet 2
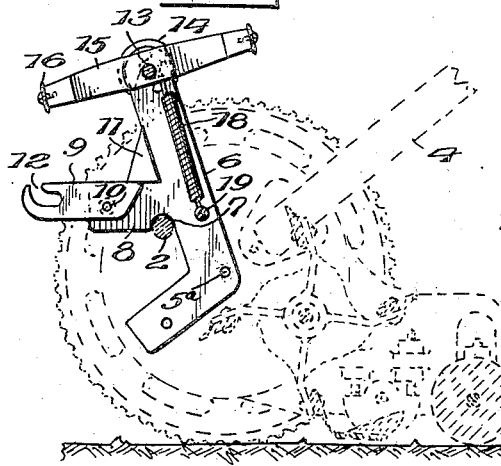
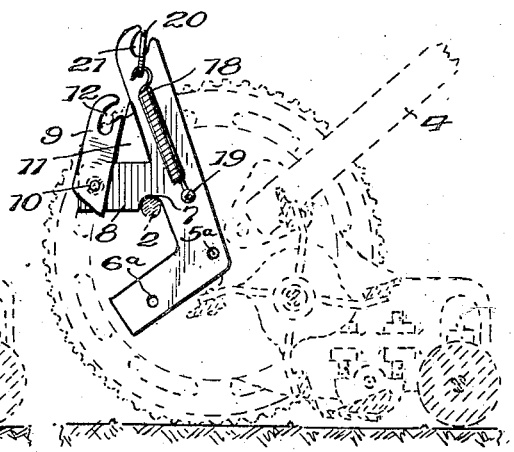
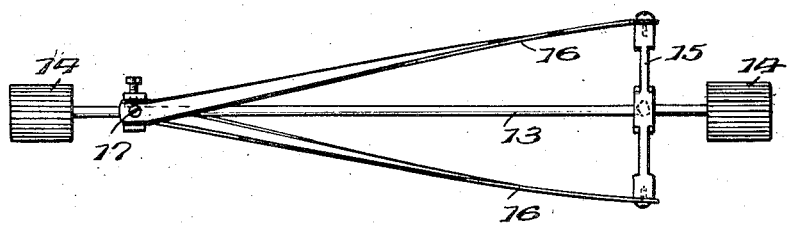
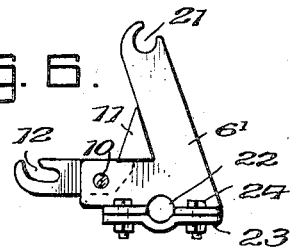
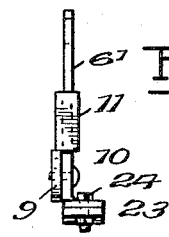
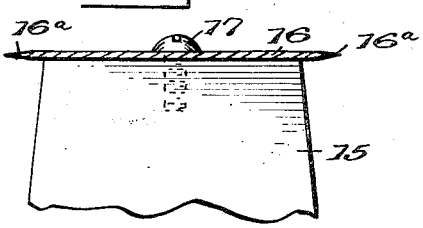

Patented Oct. 31, 1939

2,178,503

UNITED STATES PATENT OFFICE 2,178,503

GRASS AND WEED CUTTER

William N. Thompson, Philadelphia, Pa., assignor of one-half to J. F. Wolf, Cranford, N. J.

Application September 1, 1937, Serial No. 162,014

13 Claims. (Cl. 56—238)

This invention relates to grass and weed cutters and more particularly to a cutter of the reel type adapted to cut relatively tall grass.

One object of the invention is to devise a cutter of this type in which the cutting blades are formed of extremely thin resilient steel strips and are thus easy to sharpen and maintain in effective cutting condition.

Another object is to provide a grass and weed cutter of the reel type in which the reel revolves in such a direction that the blades move upwardly and forwardly as the machine advances.

A still further object is to provide means whereby a reel type cutter of the above character may be readily applied as an attachment to existing commercial forms of lawn mowers, and when so applied, may be readily shifted from operative to idle position.

In order that the invention may be readily understood, reference is had to the accompanying drawings, forming part of this specification, and in which:

Figs. 3 and 4 are views similar to Fig. 2, but showing the parts in different positions;

Fig. 5 is a front elevation of my improved reel type cutter itself;

Figs. 6 and 7 are a side elevation and edge view, respectively, of a modified form of supporting bracket which I may employ; and Fig. 8 is a fragmentary sectional view on an enlarged scale, showing one of my improved cutting blades and a portion of the supporting arm on which it is mounted.

Figures 1, 2:
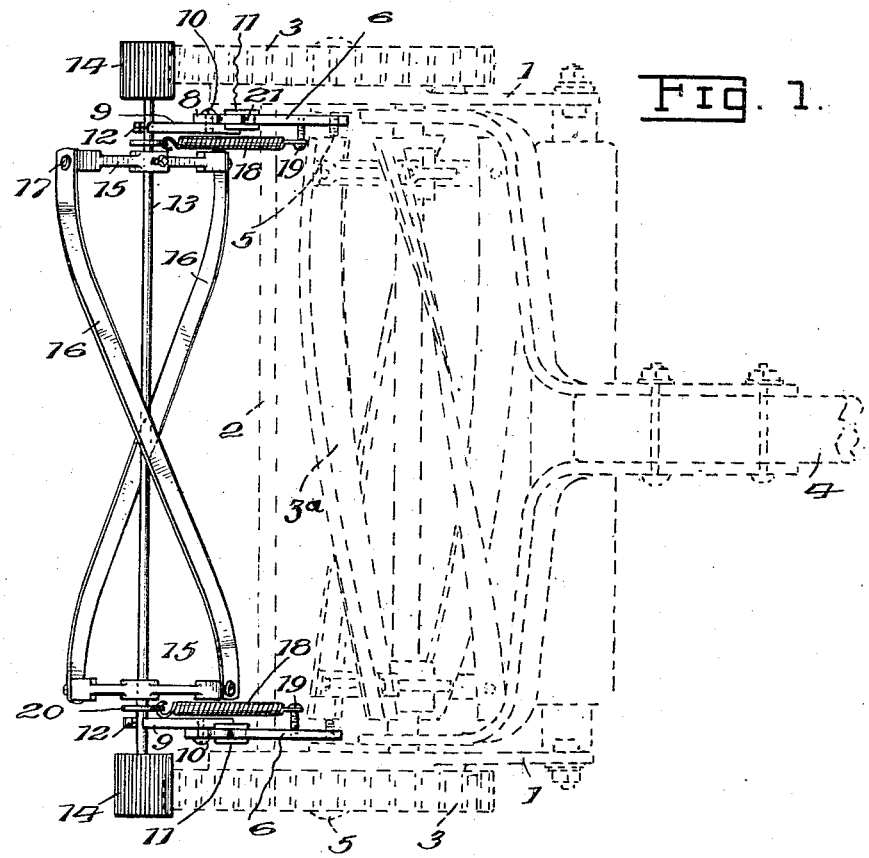
Fig. 1 is a plan view showing my improvements applied to a conventional form of lawn mower, the mower itself being illustrated in dotted lines.
Fig. 2 is a transverse vertical section through the machine shown in Fig. 1.

Referring to the drawings in detail, I have illustrated in dotted lines in Figs. 1 and 2 a conventional lawn mower comprising end members 1 connected by the usual cross bar 2, and mounted on a pair of wheels 3, which drive the usual cutter reel 3ª. The usual handle 4 is provided for propelling the machine.

The wheels 3 are normally secured to the side members of the mower by means of bolts 5, having on their inner ends nuts (not shown).

For attaching my improved cutter to a lawn mower of this type, I provide a pair of brackets 6. These brackets have a notch 7 adapted to engage over the cross bar 2 of the mower frame and have formed therein threaded openings 5ª adapted to receive the ends of the bolts 5, the brackets thus taking the place of the usual nuts.

As illustrated, these brackets have a lateral extension at their lower ends provided with an additional threaded opening 6ª, these openings 6ª being adapted to be used in applying the brackets to mowers of a type different from that illustrated in the drawings.

Projecting substantially horizontally from each of the brackets 6 is an extension 8 to which is pivotally secured an arm 9 by means of a screw 10. This screw is threaded into the arm 9 and thus, by tightening the same, the arm may be clamped in the position shown in Figs. 1 and 2 or in the position shown in Fig. 4. In the angle between the bracket 6 and extension 8 is an integral block 11, having a thickness greater than that of the bracket, so that it projects on either side of the faces of the bracket, as shown in Figs. 1 and 7. The lower projecting edge of this block thus acts as a stop against which the rear end of the arm 9 engages so that the arm is rigidly held in horizontal position.

At the outer end of each arm 9 is a bearing notch 12, and at the upper end of each bracket 6 is a second bearing notch 21.

My improved cutting reel comprises a shaft 13, adapted to be seated either in the notches 12 or in the notches 21, as desired, but shown in Figs. 1 and 2 as supported in the notches 12. To the outer ends of the shaft 13 are secured rollers 14, frictionally engaging the treads of the wheels 3 so as to be driven thereby. The surface of these rollers is preferably of rubber or other non-slipping material.

Rigidly mounted on the shaft 13 are a pair of arms 15 angularly displaced approximately 90° with respect to each other. Extending between and supported by the ends of these arms are a pair of cutting blades 16, each consisting of a thin, flat, resilient strip of highly tempered steel such as that from which razor blades or hack saw blades are made. These blades are secured at their ends to the arms 15 by means of screws 17, and are otherwise free and unsupported throughout their length, being stretched between said arms under tension, like a hack saw blade. By reason of the angular relation of the arms, each blade is given a quarter turn so that it is of helical form, the flat sides of the blade conforming substantially with the surface of a cylinder, and being disposed tangentially thereof.

The shaft 13 is held in notches 12 by means of a pair of springs 18, each secured at one end to one of the brackets 6 as at 19, and having at its other end a hook 20 adapted to engage over the shaft 13. In view of the fact that the notches 12 are somewhat elongated as shown in Fig. 3, the tension of springs 18 serves to resiliently hold the rollers 14 in frictional engagement with the wheels 3.

With the cutting reel mounted as shown, it will be therefore apparent that as the lawn mower advances, this reel will be driven by the wheels 3 in a direction opposite to that in which the wheels turn. This results in driving the blades 16 in such a direction that their forward cutting edges move forwardly and upwardly as shown in Fig. 2, as the machine travels along. In other words, these blades cut with an upward stroke instead of a downward stroke, as is usual.

It will be also noted, by reference to Fig. 2, that the lowest point reached by the blades 16 is considerably higher than the lowest point or effective plane of operation of the cutter reel 3ª.

As shown in Fig. 8, the blades 16 are preferably sharpened at both edges, as indicated at 16ª. Due to this, when one edge becomes dulled, the blades may be taken off of the arms 15 and reversed, thus providing a new cutting edge.

When it is desired to render my improved cutting reel inactive or idle, as in transporting the machine from place to place, or while cutting areas where the grass is short, the reel may be readily removed from the bearing notches 12 and placed in the bearing notches 21, as shown in Fig. 3, the springs 18 serving to hold it in position in these notches also. When the shaft is supported in the notches 21, it will be noted that the rollers 14 are clear of the wheels 3, so that the reel is not driven.

If at any time it becomes desirable to completely detach my improved cutter from the lawn mower, the reel may be entirely removed by disengaging the hooks 20 from the shaft 13. When this is done, these hooks 20 may conveniently be engaged over the upper ends of the brackets, as shown in Fig. 4. At the same time, the arms 9 may be folded back into the position shown in Fig. 4, in which they rest against the blocks 11, and secured in this position by tightening the screws 10. Thus, there will be no projecting parts to interfere with the normal operation of the mower.

Instead of providing brackets such as 6 and securing them to the frame by means of the bolts 5, I may, in some cases, employ brackets of the type shown at 6' in Figs. 6 and 7. These brackets comprise parts similar to the bracket 6, and similarly numbered, but, in addition, they are provided at their lower edge with an opening 22 adapted to fit over the cross bar 2 of the mower frame. The lower side of this opening is closed by a clamping plate 23 secured by bolts 24 to flanges on the bracket. It is obvious that a bracket of this type can be clamped upon the cross bar of a mower in any desired position, and will serve to support my improved cutting reel in either operative or idle position, as required.

While I have shown and described my improved cutter as an attachment for existing types of lawn mowers, it will be understood that, in its broadest aspect, the invention is not limited to the cutter being employed as an attachment. It may be mounted upon a separate wheeled frame of its own, since it functions wholly independently of the lawn mower.

What I claim is:

1. A cutting reel for grass cutting machines, said reel comprising a shaft having fixed thereon a pair of spaced double ended arms secured thereto at their middle and angularly displaced approximately ninety degrees with respect to each other, and a pair of thin, flat, resilient blades attached at their ends to and held under tension between the respective ends of said arms, and tangentially disposed.

2. A law mower attachment for cutting tall grass, comprising a pair of independent bearing brackets, means for rigidly and individually securing the same to the lawn mower frame, bearings in said brackets, a reel type cutter having a shaft journalled in said bearings, rollers on the ends of said shaft engaging the lawn mower wheels, and a spring attached to each bracket and to said shaft for urging said rollers into frictional contact with the treads of said wheels, whereby said cutter is caused to revolve as the lawn mower advances.

3. A lawn mower attachment for cutting tall grass, comprising a pair of similar bearing brackets adapted to be rigidly secured to the lawn mower frame, each of said brackets comprising a fixed portion and a movable arm pivotally secured thereto to swing in a vertical plane, but normally projecting substantially horizontally therefrom, said arm having a longitudinally extending slot adjacent its free end, and a reel type cutter having a shaft adapted to be supported in said slots each of said arms being capable of being swung to substantially upright position when desired.

4. An attachment for a lawn mower having the usual frame and wheels, and a bolt securing each wheel to the frame, said attachment comprising a pair of brackets each having a threaded opening with which the inner end of one of said bolts engages in place of the usual nut, and a reel type auxiliary cutter supported by said brackets.

5. In combination with a lawn mower having the usual wheels, a bolt securing each wheel in position, and a transverse rod constituting part of the frame on which the wheels are mounted, a bracket having a threaded opening with which the inner end of said bolt engages, said bracket being so positioned that it also engages said rod, and is thus held against angular displacement, and a reel type auxiliary cutter supported by said bracket.

6. A lawn mower attachment for cutting tall grass, comprising a pair of bearing brackets, means for rigidly securing the same to the lawn mower frame, a reel type cutter having a shaft, rollers on the ends of said shaft, and said brackets having means whereby said shaft may be rotatably supported thereby either in an operative position in which said rollers frictionally engage the treads of the lawn mower wheels, or in an idle position in which said rollers are clear of said wheels.

7. A lawn mower attachment comprising bearing bracket means, means for rigidly securing the same to the lawn mower frame, said bracket means having open ended elongated slots therein, a reel type cutter having a shaft insertable laterally into and supported in said slots, rollers on the ends of said shaft frictionally engaging the treads of the lawn mower wheels, and means for resiliently urging said shaft longitudinallly of said slots toward said wheels.

8. An attachment for use with lawn mowers having the usual frame and driving wheels, said attachment comprising bracket means having bearings therein, means for securing said bracket means to the lawn mower frame, a reel-type cutter having a shaft journalled in said bearings parallel with the axis of said wheels and having a pair of thin, flat, tangentially disposed blades rigidly secured to said shaft, and rollers carried by the ends of said shaft laterally beyond said bearings, said rollers, when said bracket means are attached, being in frictional driving contact with the treads of said wheels, whereby, as the lawn mower advances, said cutter is caused to revolve in a direction opposite to that in which said wheels rotate.

9. A grass cutter comprising a frame, a pair of spaced, co-axial wheels on which said frame is mounted, a pair of independent bearing members carried by said frame, a shaft journalled in said bearing members and disposed parallel with the axis of said wheels at a higher level than said axis, a reel type cutter comprising a pair of arms rigidly secured to said shaft, one adjacent each of said bearing members, and a pair of thin flat blades attached to the ends of said arms and disposed tangentially, and rollers carried by the ends of said shaft and in frictional driving contact with the treads of said wheels, whereby said shaft is driven by said wheels in a direction opposite to that in which they revolve.

10. An attachment for lawn mowers having the usual frame and front cross bar, and wheels mounted on said frame, said attachment comprising bracket means supported on said cross bar, a shaft journalled in said bracket means, rollers secured to the ends of said shaft and positioned to frictionally engage the treads of said wheels and be driven thereby in the opposite direction, means for resiliently urging said rollers toward said wheels, and auxiliary rotary cutter means operatively connected with said shaft and located in front of said bar.

11. An attachment for lawn mowers having the usual wheels and cutter reel, comprising auxiliary rotary cutter means and a shaft connected therewith, bracket means in which said shaft is journalled, rollers secured to the ends of said shaft laterally of said bracket means, means other than said rollers for supporting said attachment on a lawn mower with said shaft parallel with said reel and said rollers frictionally engaging the treads of said wheels, and spring means urging said rollers against said wheels so that they are rotated thereby.

12. An attachment for a lawn mower that has a cutter reel and drive wheel means, said attachment comprising rotatable cutter means embodying a shaft and a pair of blades carried thereby and spaced apart, supporting means in which said shaft is journalled and adapted to be fastened to said lown mower, and friction wheel means connected with said cutter means and in contact with the treads of said drive wheel means so as to be rotated thereby in a direction opposite to that in which the latter revolve, said blades at their lowest point during rotation of said cutter means being higher than the lowest point of said cutter reel.

13. An auxiliary cutter device for lawn mowers having a frame, a pair of spaced co-axial wheels on which the frame is mounted, and the usual main cutting mechanism, said device comprising a horizontal shaft supported by said frame at a point in advance of said wheels and extending parallel with and above the axis thereof, a reel type cutter carried by said shaft and embodying a pair of thin flat blades disposed tangentially to the surface of a cylinder, and means whereby said cutter is rotated in a direction opposite to that in which the wheels revolve, whereby the cutting edges of the blades move forwardly and upwardly, as the machine advances, the lowest point of said blades being well above the plane of action of said usual main cutting mechanism.

WILLIAM N. THOMPSON.